United States Patent [19]
Ciora et al.

[11] Patent Number: 6,117,327
[45] Date of Patent: *Sep. 12, 2000

[54] DEASHING AND DEMETALLIZATION OF USED OIL USING A MEMBRANE PROCESS

[75] Inventors: Richard J. Ciora, Butler; Paul K. T. Liu, Pittsburgh, both of Pa.

[73] Assignee: Media and Process Technology Inc., Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/136,555

[22] Filed: Aug. 19, 1998

Related U.S. Application Data

[60] Provisional application No. 60/056,667, Aug. 22, 1997.

[51] Int. Cl.[7] .................................................. B01D 61/22
[52] U.S. Cl. ......................... 210/637; 210/638; 210/651; 210/805; 208/180
[58] Field of Search ..................................... 210/637, 638, 210/650, 651, 805; 208/179, 180, 181, 182

[56] References Cited

U.S. PATENT DOCUMENTS

| | | | |
|---|---|---|---|
| 3,919,075 | 11/1975 | Parc et al. | 208/180 |
| 3,930,988 | 1/1976 | Johnson | 208/182 |
| 4,151,072 | 4/1979 | Nowack et al. | 208/182 |
| 4,269,698 | 5/1981 | Kreger | 208/180 |
| 4,406,743 | 9/1983 | MacQueen et al. | 196/46 |
| 4,411,774 | 10/1983 | Johnson | 208/179 |
| 4,411,790 | 10/1983 | Arod | 210/637 |
| 4,502,948 | 3/1985 | Tabler | 208/183 |
| 4,512,878 | 4/1985 | Reid et al. | 208/179 |
| 4,789,460 | 12/1988 | Tabler et al. | 208/180 |

FOREIGN PATENT DOCUMENTS

| 1164590 | 6/1984 | Canada | 182/15.4 |
|---|---|---|---|

*Primary Examiner*—Ernest G. Therkorn
*Attorney, Agent, or Firm*—Andrew Alexander

[57] ABSTRACT

A method suitable for treating used oil to remove ash and metal contaminants therefrom with minimum oxidation of the oil, the metal including at least one of the components of iron, lead, copper, zinc, sodium, magnesium, and calcium, to provide a highly purified oil product having less than 10 ppm of at least one of the contaminants and less than 0.15 wt. % of ash content. The method comprises providing a body of oil to be purified and chemically treating the oil to condition ash and metals contained therein to facilitate removal of ash and metal during membrane purification of the oil. A porous inorganic membrane module having a high pressure side and a low pressure side is provided and the chemically treated oil is introduced to the high pressure side of the membrane module to provide an oil permeate on the low pressure side and an ash and metal-rich concentrate on the high pressure side thereby separating ash and metals from the oil to provide the highly purified oil product at an improved level of throughput of the membrane compared to feed oil not chemically treated.

27 Claims, 4 Drawing Sheets

DEASHING AND DEMETALLIZATION OF USED OIL USING A MEMBRANE PROCESS

CROSS-REFERENCE TO RELATED APPLICATION

This application claims the benefit of U.S. Provisional Application Ser. No. 60/056,667, filed Aug. 22, 1997.

BACKGROUND OF THE INVENTION

This invention relates to purifying used motor, hydraulic, gear, and other oils. More particularly, it relates to a new process for purifying spent oils employing a combination of chemical treatment and membrane process technology. Because of the very low level of contaminant, e.g., ash and metals, resulting from this new process, the oil recovered can be re-used in its original applications or used for fuel applications.

Nationwide about 1.3 billion gallons of used motor and other oils are generated annually. About 70% is currently being recycled as fuel. The remainder is not collected or is lost in usage. These oils can contain up to 15 to 20% of impurities, such as water, sludge, carbonaceous particles and oxidation products. When reused as fuel, these contaminants create air pollution problems. Generally, the used motor oil contains 0.5 wt. % of ash residue after combustion.

By oil as used herein is meant to include all kinds of synthetic and mineral oils including crude oil, and particularly spent or used engine oils, hydraulic oils, cooking oils and the like from which fractions of contaminants such as debris, metal and ash can be removed to permit its reuse as fuel or for other applications.

Most often, the used oil is an uneven product of oil collected from several sources. The main contaminants typically are:

Water from engines and storage.

Dissolved gasoline and gas-oil, resulting from use in engines.

Solvents, aromatics and cleaning fluids.

Sediments, consisting of: carbonaceous particles, resulting from poor combustion of motor fuels; metal particles, brought in by wear and corrosion, external dust.

Lead from gasoline and anti-knock additives.

Polymeric additives, for viscosity improvement or sludge dispersion (polymethacrylates, polysuccinmides).

Non polymeric anti-oxidants, anti-wear or detergent dispersing additives (zinc dialkyl-dithiophosphates, calcium or barium salicylates, acoylphenates or sulfonates).

There are several processes available for purifying used oil. The ash and other contaminants can be removed by chemical cracking, membrane-based filtration and evaporation.

The membrane-based process for waste oil purification has been explored and disclosed to reduce ash content. For example, in Canadian Patent 1,168,590, used motor oil was treated with $Al_2O_3$ and MgO mixed oxide ultrafiltration membranes with pore sizes ranging from 50 to 250 Å to remove impurities and additives. Ash content of the product is listed as <0.005 wt. % from the feed containing 0.35 wt. %. However, substantial heavy metals remain in the product, such as from 8 to 241 ppm of lead, and 6 to 152 ppm of iron. U.S. Pat. No. 3,919,075 discloses using polymeric ultrafiltration membranes, and lead content was reduced from 460 to 260 ppm, and the ash content was reduced from 20 to ~0.07 wt. % (Example 14 and 15). The membranes reported in the literature show the capability of significant reduction in the ash content; however, substantial heavy metals such as lead still remain. Evidently some ash precursors and/or heavy metal contaminants are dissolved or well dispersed in waste oil. Therefore, even inorganic membranes with the pore size as small as 50 Å were unable to achieve significant removal of selected heavy metals. Often throughput is sacrificed because of the use of the membrane with such a small pore size to treat viscous waste oil. An increase in operating temperature can alleviate the throughput limitation; however, it introduces another disadvantage: generation of odorous compounds, such as mercaptans. In short, there is no practical solution available to achieve a substantial ash and heavy metal removal with the existing technology. Thus, there is a great need to provide an improved process which will remove ash and metals to a very low level and permit reuse of the oil in the original applications. The present invention provides such a process.

SUMMARY OF THE INVENTION

It is an object of this invention to treat oil to substantially remove contaminants therefrom.

It is another object of this invention to remove contaminants such as ash from used oil using combinations of chemical treatments and membrane filtration.

Yet it is another object of this invention to improve production using a combination of chemical treatments and membrane process for used oil purification.

And yet it is another object of this invention to treat used oil to achieve a substantially complete removal of contaminants, e.g., ash and metals, therefrom utilizing a chemical conditioned feed and membrane purification of spent oil.

Still it is yet another object of this invention to improve the thermal stability of the used oil when using high temperature membrane treatment processes.

These and other objects will be apparent from an inspection of the specification, claims and figures attached hereto.

In accordance with these objects, there is disclosed a method suitable for treating used oil to remove ash and metal contaminates to a very low level, the metals including iron, lead, copper, zinc and others to provide a purified oil product having extremely low levels of ash and metals which permit use of the oil in original applications. The method comprises the steps of providing a body of oil to be purified and chemically treating the oil to condition the ash and metals contained therein to facilitate or enhance ash and metal removal and improve productivity during membrane purification. A porous inorganic membrane module having a high pressure side and a low pressure side is provided and the chemically treated oil is introduced to the high pressure side of the membrane module to provide an oil permeate on the low pressure side and an ash and metal-rich concentrate on the high pressure side thereby separating ash and metals in the oil to provide an oil permeate extremely low in ash and metal content. Alternatively, the above chemical conditioning of the feed can be practiced as a post-conditioning step.

DETAILED DESCRIPTION OF THE PREFERRED EMBODIMENTS

Figure 1A:
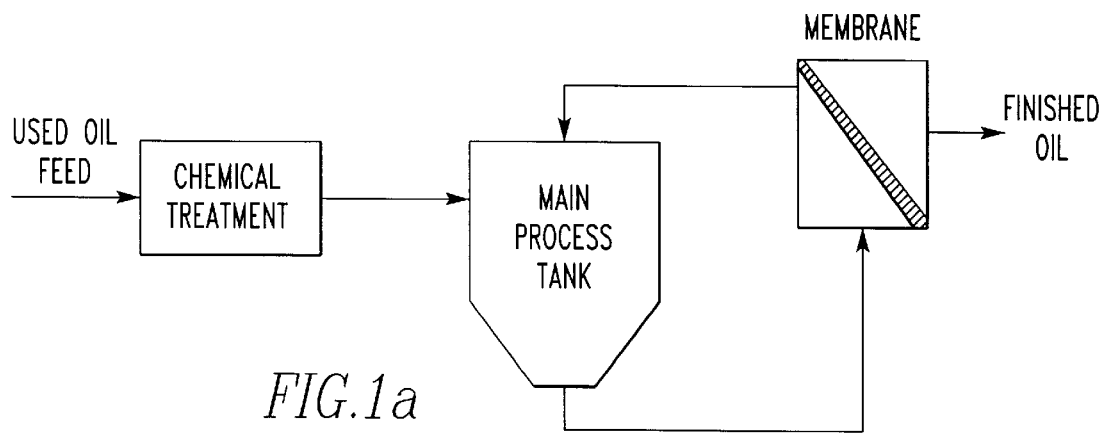
FIGS. 1a and 1b are block diagrams showing an improved membrane-based filtration with pre- and post-conditioning of the feed respectively.

This invention includes the use of a microporous inorganic membrane process, e.g., stainless steel or ceramic, to treat the used oil which is conditioned or reacted with chemicals prior to purifying with a membrane to facilitate ash and metals removal to a remarkably low level. The inorganic membrane can be comprised of stainless steel or ceramic material.

The chemical treatment combined with the membrane process has unique advantages over evaporation/distillation. Quite surprisingly, it has been discovered that the membrane process is energy efficient in removing ash and metal when combined with a suitable chemical treatment. In the past, evaporation has been used in concentrating ash and other contaminants in the residue while evaporating the majority of oil. However, evaporation requires high temperature and sometimes vacuum to evaporate the oil. In the present process, most of the contaminants are removed without involving phase change. Thus, significant energy saving can be achieved. Further, the present process is less susceptible and less sensitive to feed variation. It should be understood that the composition of used oil collected from miscellaneous sources can vary significantly, and therefore the chemical treatment combined membrane process is uniquely suitable for reclaiming waste oil and permitting its use in original applications, for example.

This invention demonstrates both improved contaminant removal and productivity with this treatment process. Certain contaminants, such as iron, are difficult to remove and cannot be removed completely with a membrane treatment alone. With conditioning in accordance with the invention and in combination with membrane treatment, substantially complete removal of contaminants is achieved. Also, it will be appreciated that chemical conditioning alone does not adequately remove contaminants to a suitable level. That is, neither chemical treating alone nor the membrane treatment alone removes contaminants to a suitable level to permit the oil to be re-used in its original application.

In accordance with results of the invention shown in Table 1 of Example 1, it will be seen that conditioning or treating the spent oil with a chemical (diammonium phosphate (DAP)) followed by membrane purification surprisingly results in a permeate having only 1 ppm iron. The feed had 205 ppm iron. By comparison, it was found that chemical treatment alone leaves 35 ppm iron while membrane treatment alone leaves 39 ppm remaining in the oil. Further, copper is not effectively removed to a low level either by the membrane treatment (202 ppm copper removed to 20 ppm), or chemical preconditioning (202 ppm to 193 ppm). In fact, the chemical treatment is particularly ineffective. By comparison, the process of the invention surprisingly removes copper to 4 ppm. Further, in the membrane treatment, zinc is only removed from about 860 ppm to 165 ppm and to about 20 ppm with a chemical treatment. Again, the membrane is ineffective in removing zinc to a very low level. By comparison, when used oil is treated in accordance with the invention, the permeate only contains 8 ppm zinc (see Table 1).

Because waste oil contains a wide spectrum of contaminants and the contaminant concentration level and its actual chemical state can vary greatly depending upon the source of waste and the type of additives used, for example, the inventors do not wish to be bound by any specific mechanisms for the removal of heavy metal contaminants to a low level, in accordance with their invention. Although the detailed reaction involved in the chemical treating of spent oil is complex, it is believed that the dissolved or dispersed contaminants react during chemical treatment and/or degrade during the chemical treatment to become an insoluble species. Further, the contaminants can react to form aggregates during the chemical treatment. Some of the species or aggregates from the chemical treatment can be removed by settling and phase separation or conventional filtration with or without the addition of filter aides. However, it has been discovered that the remaining contaminant can then be removed by the membrane process.

Another aspect of this invention involves productivity improvement by use of the subject invention, particularly with respect to membrane throughput. It has been discovered that if the used or spent oil is chemically treated followed by membrane filtration in accordance with the invention, the productivity of the membrane (in terms of throughput) at a given concentration level is improved dramatically. By comparison, using the same membrane and the same feed source, the permeance from the feed without the chemical treatment decays significantly, for example, at about 90% recovery in comparison with the preconditioned feed, as discussed in Example 2.

Although many process configurations of the invention are possible, the process normally involves withdrawing permeate with exceptionally low contaminants, e.g., ash and metals, as a product while concentrating such contaminants in the raffinate or high pressure side of the membrane.

It will be appreciated that in the process the feed viscosity increases along with the level of concentration. At a high level of concentration the membrane process can become very inefficient because of the high viscosity that results. This phenomenon is explained by the equation describing ultrafiltration membrane throughput as follows:

$$J = \frac{\varepsilon r^2 P}{8\eta \Delta X}$$

J=flow rate through the membrane
P=applied transmembrane pressure
$\eta$=viscosity of fluid
r=pore radius
$\varepsilon$=porosity of membrane
$\Delta X$=length of the channel (i.e., skin thickness of membrane)

This equation indicates that for a given membrane its throughput, i.e., permeate flux, can be improved with the reduction of the viscosity of the fluid. One way to achieve this is through an increase in the operating temperature. For used oil applications, temperatures at 200 to 300° C. can be used to improve throughput. However, temperatures in this range are undesirable due to the added hardware expense, generation of mercaptan and other odors, additional safety precautions, oxidation of the feed, and increased energy expense. This presents a serious problem with regard to the efficient use of the membrane for ash and contaminant removal in processing the used oil.

Figure 4:
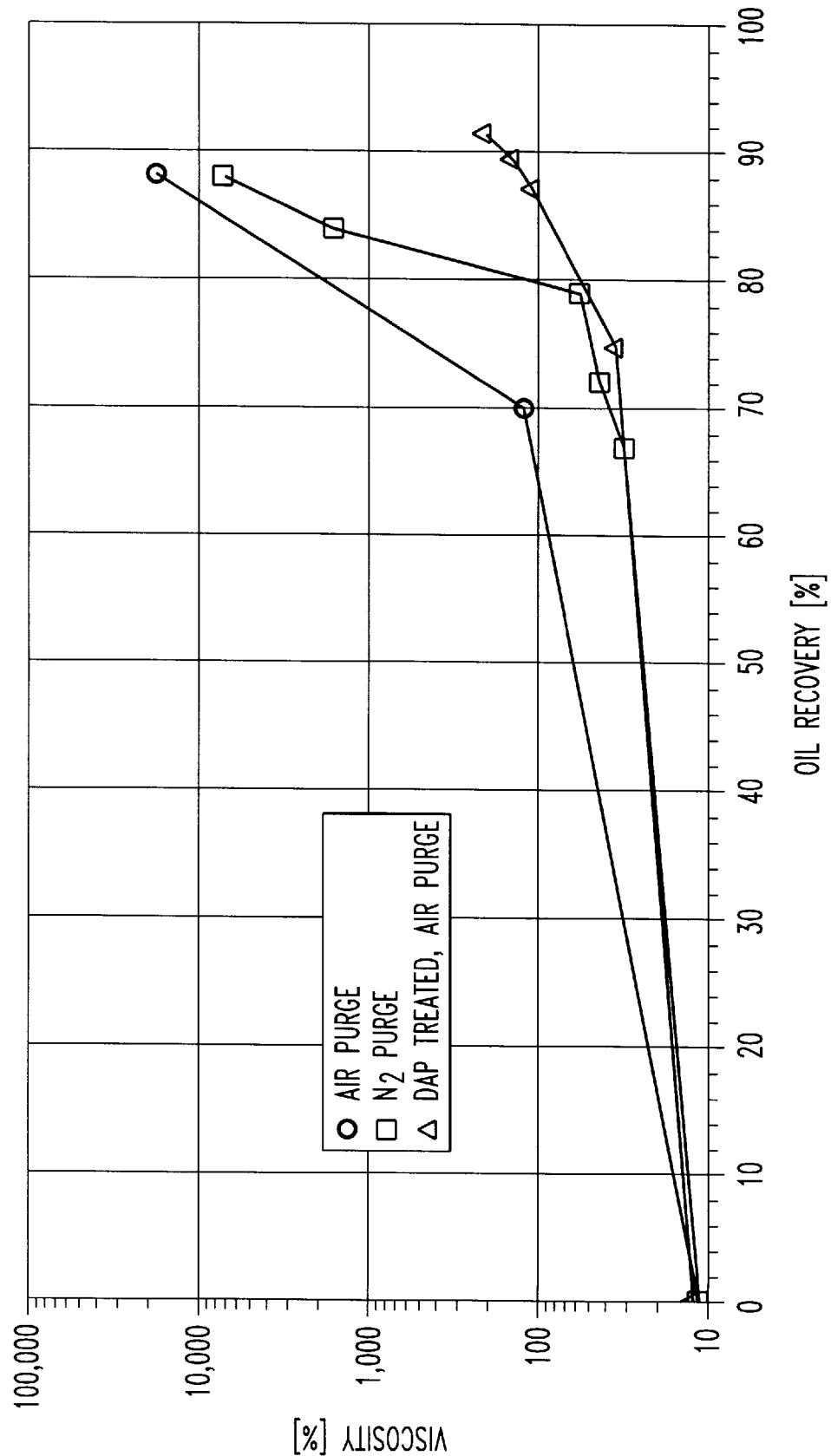
FIG. 4 shows viscosity increase as a function of the percent of used oil recovered as permeate throughout the membrane concentration process.

The productivity improvement by the process of the invention results primarily from the retardation of the viscosity increase throughout the purification process by the membrane, as shown in FIG. 4. By comparison, the viscosity of the used oil in feed that had not been treated in accordance with the invention increased substantially at a similar concentration level with the resulting loss in productivity. The retardation of the viscosity is attributed to the removal of some contaminants by the chemical treatment, which significantly reduces the viscosity of the feed, thereby providing a higher throughput. That is, in the present invention, it has been discovered that the viscosity of the feed to the membrane does not increase substantially with the resulting drop in productivity at or through the membrane.

Figure 3:
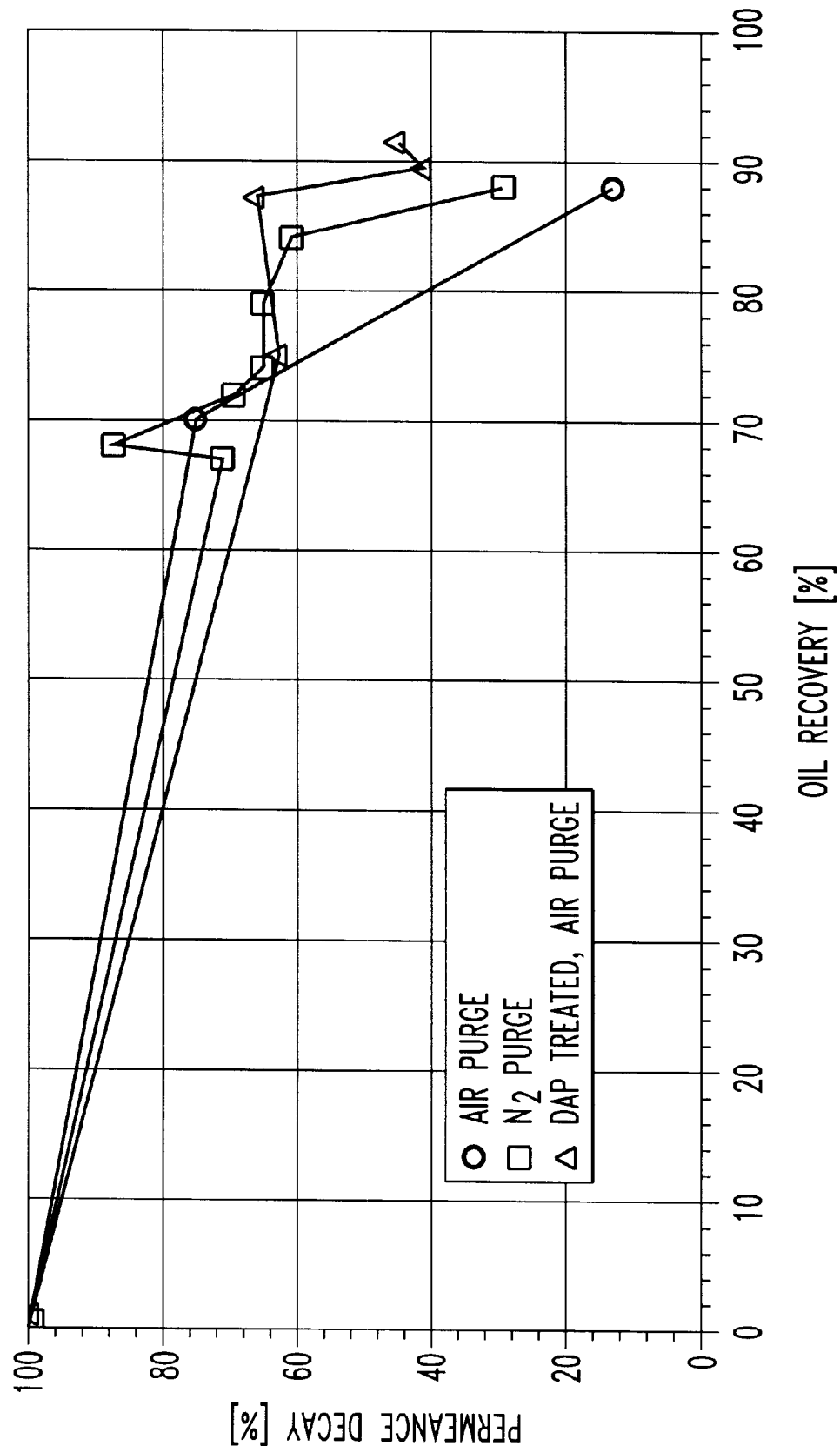
FIG. 3 presents the permeance decay as a function of the percent of used oil recovered as permeate throughout the membrane concentration process.

Further, thermal stability of the used oil was improved with chemical treating. Oxidation of the feed oil at a high temperature resulted in the viscosity increase throughout the concentration process as indicated in FIGS. 3 and 4 showing the difference between the runs with air vs. nitrogen purge for the feed oil without chemical treating. It is believed that the oxidation and the resultant viscosity increase were catalyzed or accelerated by the heavy metal contaminants in the feed to the membrane. Surprisingly, it has been found that oxidation of the oil is inhibited when the spent oil is chemically treated in accordance with the invention prior to membrane filtration and contaminants are removed. This aspect of the invention is illustrated in Example 2.

Figure 1B:
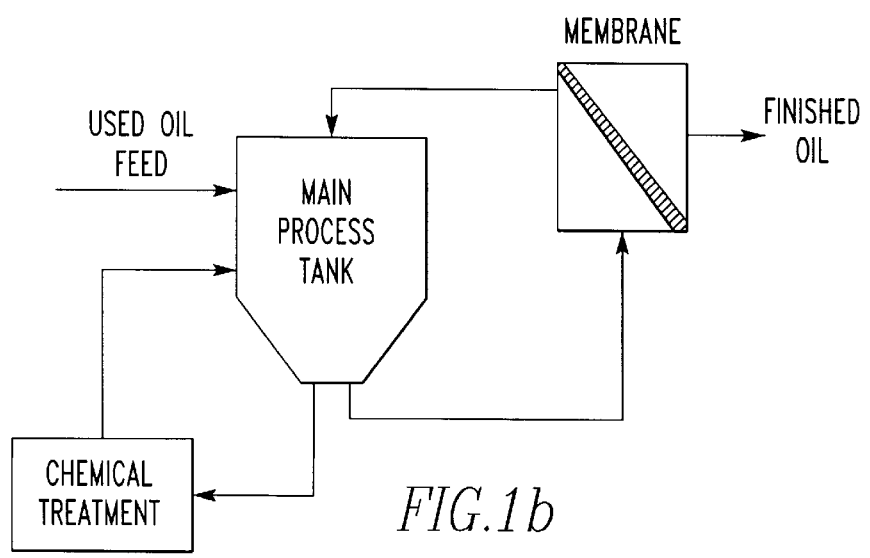

In yet another aspect of the invention, the spent oil can be chemically treated after or when a raffinate stream is removed from the high pressure side of the membrane. This removes contaminants concentrated in the raffinate. The raffinate may be removed periodically or continuously. Upon removal, the contaminant concentrated raffinate is chemically treated to precipitate or agglomerate contaminants. After precipitation or agglomeration of the contaminants, the spent oil depleted in contaminants is again introduced to the high pressure side of membrane unit. This aspect of the invention is particularly suitable for steady state operation to avoid the cumulation of contaminants in the feed tank. Both pre- and post-chemical treating are presented in FIGS. 1a and 1b to illustrate the invention involving the improvement of the basic treatment process.

Figure 2:
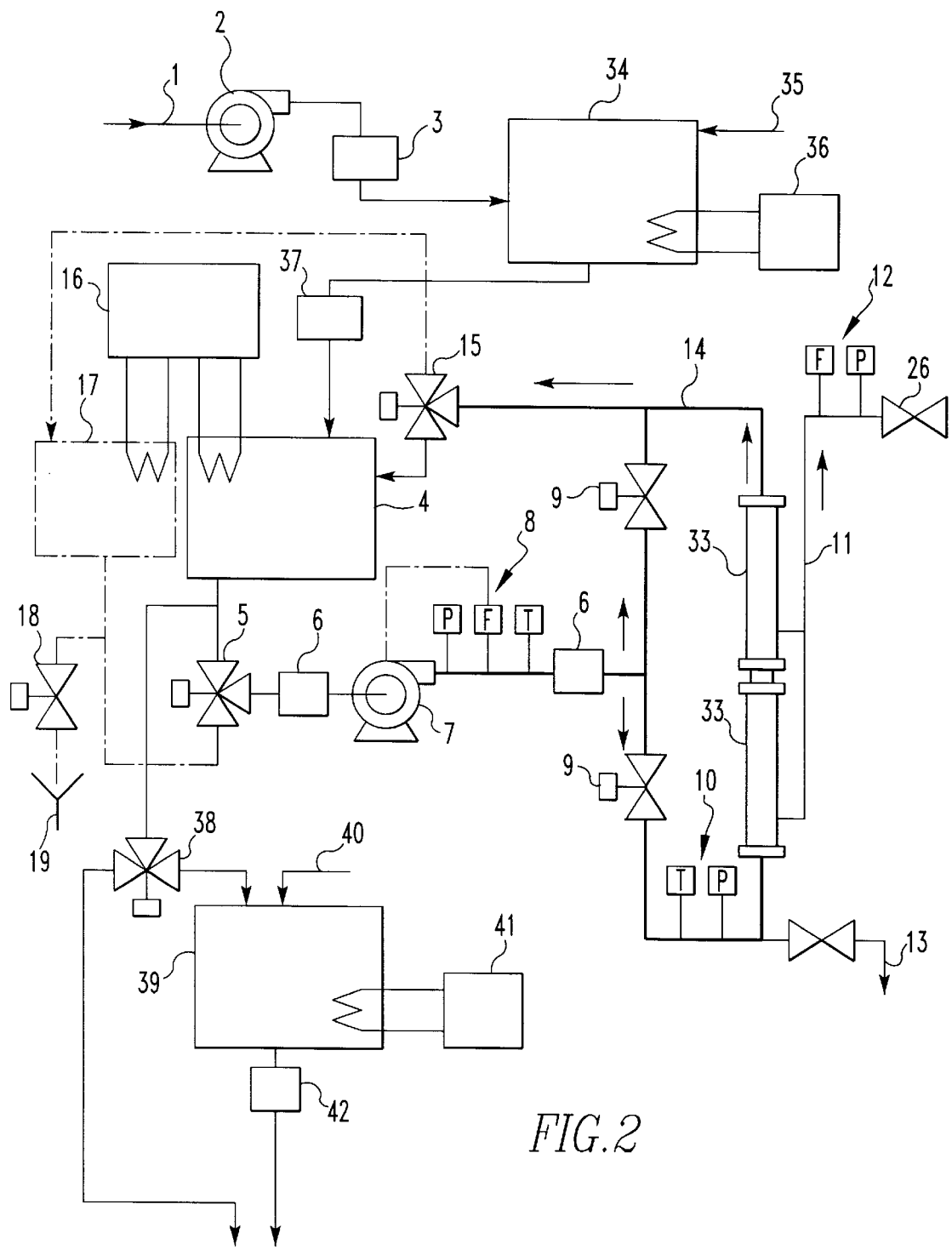
FIG. 2 is a flow diagram showing method steps in the membrane-based treatment.

FIG. 2 shows an overall process diagram of the improved process with chemical treatment of the feed. In FIG. 2, used oil 1 is fed with pump 2 through a pre-filter 3 with ~40μ pore size to remove bulk particles and debris before entering chemical treating or conditioning tank 34. Treatment chemicals 35 are added and react with the contaminants in the oil while the sample is heated with heater 36. The chemically treated conditioned oil is then filtered through ~40 μm pore size filter 37 to remove the precipitate or agglomerates resulting from the chemical treatment before entering the holding tank 4. The filtered oil is then delivered to the high pressure sides of membranes 33 by a feed pump 7. To avoid the vibration by the pump, a vibration isolator device 6 may be required prior to and after the feed pump 7. Valves 9 are installed to control the distribution of the feed oil to membranes 33 and by-pass. Also, pressure, flow and temperatures meters 10 are installed before the membranes 33 to record the temperature, flow rate and pressure of the feed and to shut off the pump in the event that the flow rate, temperature and the pressure are outside the preset range. Another set of meters 8 can be installed after the pump 7 to record the head pressure, temperature, and flow rate. Permeate is discharged along line 11 as purified product 26. Flow rate and pressure sensors 12 may be installed in the permeate line. A contaminant-rich product can be withdrawn from the system via valve 13. The retentate, specifically the material that does not permeate the membrane, can be recycled back to the holding tank 4 along line 14 through a three way valve 15. A process heater 16 can be installed to maintain the feed at the required temperature.

The membrane system can also be operated under a cleaning mode. When the membrane permeate flux falls below an acceptable level due to the deposition of matter on the membrane surface, membrane cleaning is required to regenerate the membrane. Cleaning solvent is stored in tank 17 and maintained at a controlled temperature, e.g., room temperature to 150° C. The cleaning solvent is fed to the membrane by pump 7 via a three way valve 5. The spent cleaning solution can be claimed through valve 18 and then collected in 19.

Alternatively, the feed in the high pressure side of membrane unit 33, once concentrated with high levels of ash, metals, and debris is withdrawn as a retentate or raffinate for chemical treating. That is, the spent oil is not chemically treated prior to being introduced to the high pressure side of membrane unit 33. The raffinate or retentate is returned for chemical conditioning in tank 39 by three way valve 38. Chemicals 40 are added and reacted with ash and/or metals in the raffinate or concentrated feed while being heated with heater 41. Following the chemical treatment, the oil is filtered using a filter 42 having a pore size of about 40 μm. The chemically treated stream can then be discharged or recycled back to the feed tank 4 for further processing by membrane unit 33.

Ammonium salts such as ammonium sulfate and/or ammonium bisulfate are disclosed in Johnson U.S. Pat. No. 3,930,988, incorporated herein by reference. The reaction mass is allowed to gravity separate into an oil phase and an aqueous phase which contains the precipitate of contaminants, thereby leaving an oil phase reduced in ash-producing contaminants. However, an ash content of 0.08 to 0.29 wt. % and lead content of 0.008 to 0.11 wt. % remain in the finished product oil as residue (see Table 1). Nowack et al U.S. Pat. No. 4,151,072 and McQueen et al U.S. Pat. No. 4,406,743 disclose that ammonium salts were added to used oil as an aqueous solution, and then the water was removed at 100 to 140° C. The solid precipitate is separated from the treated oil by filtering preferably with the use of a filtering aide. Johnson U.S. Pat. No. 4,411,774 discloses the addition of the treating chemicals in the absence of water but at high temperature in excess of 500° F., thereby reducing the amount of water to be removed from the oil. In U.S. Pat. No. 4,269,698, a silicate in an aqueous solution is disclosed to demetalize used oil. Polyalkoxyalkylamine is suggested in U.S. Pat. No. 4,789,460 to add to the used oil with a treating chemical, e.g., ammonium salt, to improve filtration of metals. However, these treatments are not effective in lowering the contaminants, e.g., ash and metal, to a level permitting use of the oil in its original application.

Therefore, additional treatments have been proposed. For example, an acid treatment is disclosed as a polishing step. In Tabler et al U.S. Pat. No. 4,502,948, sulfuric acid (at 30 to 95 wt. % of concentration) at dosages of 0.2 to 5 wt. % were reported. The solid was then removed with a suitable method. However, the use of acid produces acid sludge, which creates a disposal problem.

In accordance with the present invention, chemicals such as diammonium phosphate, ammonium sulfate, sodium silicate, sulfuric acid, and others are added to the waste oil for purposes of the chemical treatment. These chemicals can be added in powder form, or in an aqueous solution. The chemical treatment can take place in the temperature range of 50 to 160° C. and at atmospheric pressure. Ash and some of the heavy metals in the waste oil can form precipitate or sludges. The sludge along with the contaminants can be removed through settling or filtration. Ash contents of ≦0.15 wt. % from waste oil containing ~0.5 wt. % ash can be achieved along with the removal of selected heavy metals. In another aspect of the invention, the chemical treatment can also be practiced at a higher pressure, e.g., up to 750 psi, in the presence of water to achieve the chemical reaction. In this process, the precipitation or sludges are settled into the aqueous phase and removed through phase separation.

Preferably, the chemical treatment of used oil is performed with ammonium salts. Such salts can include ammonium sulfate, ammonium thiosulfate, ammonium bisulfate, urea sulfate, quanidine sulfate, ammonium phosphate, diammonium hydrogen phosphate, ammonium dihydrogen phosphate, ammonium polyphosphates, such as ammonium metaphosphate, urea phosphate, quanidine phosphate, as well as mixtures thereof. For purposes of the invention, the chemical treatment is preferably performed using diammonium phosphate (DAP). Preferably the DAP is dissolved in water to provide 10 to 500 gm/l of water to form a solution which is added to the spent oil to form a mixture which is then stirred and heated to a temperature in the range of 80 to 160° C. to vaporize or remove the water. Alternatively, the heavy metal containing precipitate can be separated in the aqueous phase through phase separation. The DAP can be added to the water up to the saturation limit which is typically 1300 gms DAP/l of water. The solution is added to the oil to provide from 0.1 to 10 wt. % of DAP in oil.

The mixture of solution and oil is heated to a temperature in the range of 100 to 180° C. for a period of 0.1 to 24 hours for purposes of reacting DAP with metals in the oil and forming a precipitate. After heating or thermal treatment, the precipitate may be settled and then filtered to remove large particles therefrom, if desired. Alternatively, the oil/water mixture is heated for a period of time to evaporate the water therefrom leaving a precipitate or sludge comprised of contaminants. Thereafter, the thermally treated mixture is introduced to the high pressure side of the membrane module for purposes of purification. It is preferred that the chemically treated oil is maintained at a temperature in the range of about 100 to 175° C., and typically in the range of 120 to 150° C. for purposes of passing through the membrane. Preferably, the membrane is a ceramic membrane having a pore size in the range of 250 to 10,000 Å. Such membranes are available from Media and Process Technology Inc. Typically, the high pressure side of the membrane is subjected to a pressure in the range of 5 to 100 psi with a suitable pressure being in the range of 10 to 60 psi. These conditions result in a very high purity oil permeate. The ranges set forth herein are inclusive of all the numbers within the range as if specifically set forth.

The present process is further illustrated in the following examples:

EXAMPLE 1

Used motor oil having a kinematic viscosity of 63.3 and 11.5 centistokes (cSt) at 40° C. and 100° C., respectively, an ash content of 0.602 wt. % (ASTM D482, "Standard Test Method for Ash from Petroleum Products"), and metals content as shown in Table 1 (As-Received), determined by Inductive Coupled Plasma (ICP), was used as feed. A two liter sample of this oil was placed in a four liter stainless steel flask. To this sample was added 100 cc of distilled water containing 36.12 grams of diammonium phosphate, available from Aldrich Chemical Company (Milwaukee, Wis.). While stirring, the entire mixed oil-chemical sample was heated from room temperature to 160° C. over a two hour period, and water was vaporized from the used oil. The sample was maintained at 160° C. for 24 hours and 50 cc aliquots of oil were removed at 2, 4 and 24 hours. Each sample was filtered through a −325 mesh screen and the ash contents were determined to be 0.179, 0.180 and 0.171 wt. % respectively. Additionally, the 24-hour treated sample was analyzed for metals using ICP. The results of the metals analysis for the 24-hour sample are shown in Table 1 along with the ash content (see DAP Treated Only). Following the chemical treatment, the remaining oil sample was cooled to about 50° C. and filtered through a −325 mesh screen.

This filtered oil was then transferred to a membrane system and treated at a temperature in the range of 120 to 135° C. using a membrane having a nominal pore size of 500 Å (from US Filter, Warrendale, Pa.). The oil was maintained at a transmembrane pressure of 10 to 20 psi. Under these conditions, the permeance (normalized permeate flux) of the membrane was found to be 3.8 liters per $m^2$ per hour per bar (1 mhb) at 124° C. Oil that penetrated the membrane was analyzed for both metals and ash content. The ash content was found to be about 0.0012 wt. % and the metals content is shown in Table 1 as DAP+Membrane Treated. For comparison purposes, the as-received motor oil sample was also membrane treated under the same conditions using the same membrane. The results of the ash and metals analyses of the permeate oil are shown in Table 1 as Membrane Treated Only.

Table 1 shows that percent removal of metals and ash from the as-received used motor oil sample following each of the three treatment steps described above, specifically (I) Membrane Treated Only, (ii) DAP Treated Only, and (iii) DAP+Membrane Treated.

TABLE 1

Characterization of the As-Received, Membrane Treated, and Chemically Treated Spent Motor Oil Samples

| | | Contaminant Concentration Levels | | | Contaminant Removal Ratio % | | |
| --- | --- | --- | --- | --- | --- | --- | --- |
| Contaminant | As-Received ppm | Membrane Treated Only ppm | DAP Treated Only ppm | DAP + Membrane Treated ppm | Membrane Treated Only % | DAP Treated Only % | DAP + Membrane Treated % |
| Iron Via IC | 205 | 39 | 35 | 1 | 81.0 | 82.9 | 99.5 |
| Chromium | 5 | 2 | 3 | 0 | 60.0 | 40.0 | 100.0 |
| Lead | 67 | 12 | 0 | 0 | 82.1 | 100.0 | 100.0 |
| Copper | 202 | 20 | 193 | 4 | 90.1 | 4.5 | 98.0 |
| Tin | 8 | 1 | 6 | 0 | 87.5 | 25.0 | 100.0 |
| Aluminum | 45 | 10 | 5 | 0 | 77.8 | 88.9 | 100.0 |

TABLE 1-continued

Characterization of the As-Received, Membrane Treated, and Chemically Treated Spent Motor Oil Samples

| | Contaminant Concentration Levels | | | | Contaminant Removal Ratio % | | |
|---|---|---|---|---|---|---|---|
| Contaminant | As-Received ppm | Membrane Treated Only ppm | DAP Treated Only ppm | DAP + Membrane Treated ppm | Membrane Treated Only % | DAP Treated Only % | DAP + Membrane Treated % |
| Nickel | 3 | 0 | 2 | 0 | 100.0 | 33.3 | 100.0 |
| Silver | 1 | 0 | 1 | 0 | 100.0 | 0.0 | 100.0 |
| Manganese | 5 | 0 | 0 | 0 | 100.0 | 100.0 | 100.0 |
| Silicon | 112 | 62 | 52 | 83 | 44.6 | 53.6 | 70.5 |
| Boron | 30 | 8 | 23 | 8 | 73.3 | 23.3 | 73.3 |
| Sodium | 103 | 4 | 18 | 1 | 96.1 | 82.5 | 99.0 |
| Magnesium | 244 | 13 | 6 | 0 | 94.7 | 97.5 | 100.0 |
| Calcium | 726 | 15 | 15 | 0 | 97.9 | 97.9 | 100.0 |
| Barium | 17 | 0 | 0 | 0 | 100.0 | 100.0 | 100.0 |
| Phosphorus | 495 | 155 | 381 | 154 | 68.7 | 23.0 | 68.9 |
| Zinc | 860 | 165 | 20 | 8 | 80.8 | 97.7 | 99.1 |
| Molybdenum | 3 | 3 | 0 | 0 | 0.0 | 100.0 | 100.0 |
| Titanium | 2 | 0 | 0 | 0 | 100.0 | 100.0 | 100.0 |
| Vanadium | 1 | 0 | 1 | 0 | 100.0 | 0.0 | 100.0 |
| Potassium | 0 | 0 | 0 | 0 | NA | NA | NA |
| Ash(via ASTM D482) | 6,020 | 970 | 1,520 | <50 | 83.9 | 74.8 | >99.0 |

Surprisingly, in treating the used oil in accordance with the invention, DAP+Membrane Treated had a far superior removal of ash and metal. That is, when the oil was conditioned and then subjected to membrane purification, the permeate had remarkably lower levels of ash and metals. For example, the ash content of oil treated in accordance with the invention was 19 times lower compared to Membrane Treated Only and 30 times lower compared to DAP Treated Only. This is a marked advance in oil purification. Thus, the purified oil produced in accordance with the invention could be re-used for engine lubrication or other uses not permitted with chemical or membrane treatment alone because of the high levels of ash and metals.

EXAMPLE 2

In this Example, the improvement in membrane productivity is demonstrated through a side-by-side comparison of membrane productivity using used oil feed with and without preconditioning. The permeance decay vs. oil recovery throughout the entire membrane process is shown in FIG. 3. The air and nitrogen purge represent the "typical" membrane process without chemical treating of the feed. The DAP treated sample shows the result from the chemically treated feed. The membrane used and the DAP chemical treatment protocol used are the same as used in Example 1. The operating conditions are the same as in Example 1. At ≧90% recovery, the permeance decays significantly. For example, as shown in FIG. 3, at a recovery level of 88%, about 40 to 50% of its original permeance remains with the chemically preconditioned feed, but is <15% of its original value in the typical membrane process without chemical preconditioning of the feed. The viscosity of the feed plays an important role in the permeance decay. FIG. 4 shows the viscosity vs. oil recovery ratio. The viscosity increases rapidly when the recovery levels are >70%, which correlates well with the permeance decay shown in FIG. 3. At 88% recovery, the feed in the membrane process without chemical preconditioning is ~20,000 cSt as opposed to slightly over 100 cSt for the feed with chemical preconditioning. The chemically preconditioned feed exhibits a much lower viscosity increase during the membrane concentration process, which is due in part to the removal of bulk ash during the chemical preconditioning.

Further it is believed that the thermal stability of the used oil was improved in the feed with pre-conditioning. Oxidation of the feed at a high temperature resulted in the viscosity increase throughout the concentration process as indicated in FIGS. 3 and 4 showing the difference between the runs with air vs. nitrogen purge for the feed without pre-conditioning. At ~90% concentration level, the viscosities of the feed with air and nitrogen purge are ~200 and 9,000 cSt respectively. At a similar concentration level (i.e., 88%), the permeances for the nitrogen and air purge were 30 and 12% of the original permeance respectively. The viscosity increase was contributed by the presence of the bulk heavy metal contaminants in the feed, which catalyzed/accelerated the oxidation of the feed at a high temperature and then resulted in the viscosity increase. This oxidation potential is believed to be inhibited if bulk of the heavy metal contaminant was removed via pre-conditioning. This latter advantage is evidenced in this example.

What is claimed is:

1. A method suitable for treating used oil to remove ash and metal contaminants therefrom with minimum oxidation of the oil, the metal including at least one of the components of iron, lead, copper, zinc, sodium, magnesium, and calcium, to provide a highly purified oil product, the method consisting essentially of:
    (a) providing a body of oil to be purified;
    (b) chemically treating at least a portion of said oil at a temperature not greater than 200° C. to form said ash and metals in the oil into a material rejectable during membrane purification of said oil;
    (c) providing a porous inorganic membrane module having a high pressure side and a low pressure side; and
    (d) introducing said chemically treated oil to the high pressure side of said membrane module to provide an oil permeate on the low pressure side and an ash and metal-rich concentrate on the high pressure side to separate ash and metals from said oil to provide said highly purified oil product at an improved level of throughput of said membrane compared to feed oil not chemically treated.

2. The method on accordance with claim 1 including the step of heating the oil to a temperature range of 100 to 160° C. prior to passing through said membrane module.

3. The method in accordance with claim 1 including utilizing an inorganic membrane in said membrane module having a pore size range of 50 to 8000 Å.

4. The method in accordance with claim 1 including utilizing an inorganic membrane in said membrane module having a minimum pore size of 50 Å.

5. The method in accordance with claim 1 including maintaining the pressure in the high pressure side in the range of 5 to 100 psi.

6. The method in accordance with claim 1 including maintaining the pressure in the high pressure side in the range of 10 to 60 psi.

7. The method in accordance with claim 1 including chemical treating of said used oil with an ammonium salt to form a material rejectable by said membrane module.

8. The method in accordance with claim 7 including using an ammonium salt selected from the group consisting of ammonium sulfate, ammonium bisulfate, ammonium thiosulfate, urea sulfate, ammonium phosphate, diammonium hydrogen phosphate, ammonium dihydrogen phosphate, ammonium polyphosphate, urea phosphate, quanidine phosphate and mixtures thereof.

9. The method in accordance with claim 1 including chemical treating of said used oil with chemicals in an amount ranging from 0.1 to 5 wt. % of oil.

10. The method in accordance with claim 1 wherein said chemical treating includes conditioning said used oil with an alkali metal silicate.

11. The method in accordance with claim 1 wherein said chemical treating includes conditioning said used oil with a polyalkoxyalkylamine.

12. The method in accordance with claim 1 wherein said chemical treating includes conditioning said used oil with diammonium phosphate to form a material rejectable by said membrane module.

13. The method in accordance with claim 1 including removing precipitated ash and contaminants formed after chemical treatment before introducing said chemically treated oil to the high pressure side of said membrane module.

14. The method in accordance with claim 1 including recycling said ash and metal-rich concentrate back to said body of oil to be purified.

15. A method for treating used oil to remove ash and metal contaminants therefrom, the metal contaminants including at least one of the components of iron, lead, copper, zinc, sodium, magnesium, and calcium, to provide a purified oil product having less than 10 ppm of at least one of the contaminants and less than 0.15 wt. % of ash content, the method consisting essentially of:
(a) providing a body of oil to be purified;
(b) contacting said oil with diammonium phosphate to condition said ash and said metal contaminants therewith to form an ash and metal containing material removable during membrane purification of said oil, said treating being effected at a temperature range of 50 to 200° C.;
(c) providing a porous inorganic membrane module having a high pressure side and a low pressure side, said membrane having a pore size in the range of 50 to 2000 Å;
(d) introducing said chemically treated oil at a temperature in the range of 60 to 175° C. to the high pressure side of said membrane module to provide an oil permeate on the low pressure side and an ash and metal-rich concentrate on the high pressure side to separate ash and metals in said oil to provide said highly purified oil product.

16. The method in accordance with claim 15 including the step of dissolving the diammonium phosphate in water to provide a solution prior to said contacting.

17. The method in accordance with claim 16 wherein said contacting includes mixing said solution with said used oil at a temperature in the range of 25 to 160° C. for the purposes of conditioning ash and metals contained therein.

18. The method in accordance with claim 16 wherein said solution contains 0.1 to 5.0 wt. % of diammonium phosphate.

19. The method in accordance with claim 16 including utilizing an inorganic membrane in said membrane module having a pore size range of 250 to 1000 Å.

20. The method in accordance with claim 16 wherein the high pressure side is maintained in the range of 5 to 100 psi.

21. A method for treating used oil to remove ash and metal contaminants therefrom, the metal contaminants including at least one of the components of iron, lead, copper, zinc, sodium, magnesium, and calcium, to provide a highly purified oil product having very low levels of metal contaminants and ash content, the method consisting essentially of:
(a) providing a body of oil to be purified;
(b) contacting said oil with diammonium phosphate to condition said ash and said metal into a material rejectable during membrane purification of said oil, said treating being effected at a temperature range of 50 to 160° C. to provide chemically treated oil;
(c) providing a porous inorganic membrane module having a high pressure side and a low pressure side, said membrane having a pore size in the range of 50 to 2000 Å;
(d) introducing said chemically treated oil at a temperature in the range of 60 to 175° C. to the high pressure side of said membrane module to provide an oil permeate on the low pressure side and an ash and metal-rich concentrate on the high pressure side to remove ash and metals, said method having the ability to yield an oil permeate containing 10 ppm or less of at least one of the group consisting of iron, copper and lead, 15 ppm or less of zinc, and less than 300 ppm ash, thereby providing a highly purified oil product.

22. The method in accordance with claim 21 including utilizing an inorganic membrane in said membrane module having a pore size range of 250 to 1000 Å.

23. The method in accordance with claim 21 wherein the high pressure side is maintained in the range of 5 to 100 psi.

24. A method suitable for treating used oil to remove ash and metal contaminants therefrom to provide a purified oil product having a reduced level of ash and metals, the method consisting essentially of:
(a) providing a body of oil to be purified;
(b) providing a porous inorganic membrane module having a high pressure side and a low pressure side;
(c) introducing said oil to the high pressure side of said membrane module to provide an oil permeate on the low pressure side and an ash and metal-rich concentrate on the high pressure side to remove ash and metals from said oil to provide an oil permeate extremely low in ash and metal content;
(d) chemically treating the ash and metal-rich concentrate to facilitate removal of ash and metal therefrom to provide chemically treated oil; and
(e) introducing said chemically treated oil to said membrane module to provide an ash and metal-rich concentrate and a purified oil permeate.

25. A method suitable for treating used oil to remove ash and metal contaminants therefrom with minimum oxidation of the oil, the metal including at least one of the components of iron, lead, copper, zinc, sodium, magnesium, and calcium, to provide a highly purified oil product, the method consisting essentially of:

(a) providing a body of oil to be purified;

(b) chemically treating at least a portion of said oil to form said ash and metals in the oil into a material rejectable during membrane purification of said oil;

(c) providing a porous inorganic membrane module having a high pressure side and a low pressure side;

(d) introducing said chemically treated oil to the high pressure side of said membrane module to provide an oil permeate on the low pressure side and an ash and metal-rich concentrate on the high pressure side to separate ash and metals from said oil to provide said highly purified oil product at an improved level of throughput of said membrane compared to feed oil not chemically treated, said highly purified oil product having less than 10 ppm of at least one of the contaminants selected from iron, copper, boron and calcium and having less than 0.15 wt. % ash; and (e) recycling said metal-rich concentrate to said body oil to be purified.

26. A method suitable for treating used oil to remove ash and metal contaminants therefrom with minimum oxidation of the oil, the metal including at least one of the components of iron, lead, copper, zinc, sodium, magnesium, and calcium, to provide a highly purified oil product, the method consisting essentially of:

(a) providing a body of oil to be purified;

(b) introducing used oil to said body;

(c) withdrawing a first stream of oil from said body;

(d) chemically treating said first stream of oil to react ash and metals contained therein to provide a chemically treated stream and to facilitate removal of ash and metals during membrane purification of said oil;

(e) returning said chemically treated stream to said body;

(f) withdrawing a second stream of oil from said body;

(g) introducing said chemically treated oil to the high pressure side of said membrane module to provide an oil permeate on the low pressure side and an ash and metal-rich concentrate on the high pressure side to separate ash and metals from said oil to provide said highly purified oil product at an improved level of throughput of said membrane compared to feed oil not chemically treated, said highly purified oil product having less than 10 ppm of at least one of the contaminants selected from iron, copper, boron and calcium and having less than 0.15 wt. % ash; and (h) recycling said ash and metal-rich concentrate back to said body of oil.

27. A method suitable for treating used oil to remove ash and metal contaminants therefrom with minimum oxidation of the oil, the metal including at least one of the components of iron, lead, copper, zinc, sodium, magnesium, and calcium, to provide a highly purified oil product, the method consisting essentially of:

(a) providing a body of oil to be purified;

(b) chemically treating at least a portion of said oil at a temperature not greater than 200° C. to form said ash and metals in the oil into a material rejectable during membrane purification of said oil;

(c) providing a porous inorganic membrane module having a high pressure side and a low pressure side; and (d) introducing said chemically treated oil to the high pressure side of said membrane module to provide an oil permeate on the low pressure side and an ash and metal-rich concentrate on the high pressure side to separate ash and metals from said oil to provide said highly purified oil product at an improved level of throughput of said membrane compared to feed oil not chemically treated, said highly purified oil product having less than 10 ppm of at least one of the contaminants selected from iron, copper, boron and calcium and having less than 0.15 wt. % ash.

* * * * *